United States Patent
Moeller et al.

(10) Patent No.: US 9,663,330 B2
(45) Date of Patent: May 30, 2017

(54) RAISING DEVICE CONFIGURED TO BE CONNECTED TO A TOWER SEGMENT

(71) Applicant: SIEMENS AKTIENGESELLSCHAFT, München (DE)

(72) Inventors: Jesper Moeller, Brande (DK); Kenneth Helligsoe Svinth, Aarhus C (DK); Boris Franke, Heinsberg (DE)

(73) Assignee: SIEMENS AKTIENGESELLSCHAFT (DE)

( * ) Notice: Subject to any disclaimer, the term of this patent is extended or adjusted under 35 U.S.C. 154(b) by 0 days.

(21) Appl. No.: 14/264,250

(22) Filed: Apr. 29, 2014

(65) Prior Publication Data
US 2015/0016939 A1      Jan. 15, 2015

(30) Foreign Application Priority Data

Jul. 11, 2013   (EP) .................................. 13176120

(51) Int. Cl.
*B66C 1/10*     (2006.01)
*B66C 1/44*     (2006.01)
(Continued)

(52) U.S. Cl.
CPC .............. *B66C 1/108* (2013.01); *B66C 1/442* (2013.01); *B66C 1/62* (2013.01); *E04H 12/342* (2013.01); *F03D 1/001* (2013.01); *Y02E 10/728* (2013.01)

(58) Field of Classification Search
CPC .................................. B66C 1/28; B66C 1/108
(Continued)

(56) References Cited

U.S. PATENT DOCUMENTS 168,707 A * 10/1875 Beach et al. .............. B66C 1/16
                                                            294/67.1
1,311,361 A * 7/1919 Vickers .................... A22B 5/06
                                                            294/97
(Continued)

FOREIGN PATENT DOCUMENTS

DE       102011011603 A1     8/2012
WO    WO 2012/093940    *  7/2012   ............... B66C 1/44
(Continued)

OTHER PUBLICATIONS

European Search Report; Application No. 13176120.7, issued Oct. 28, 2013; 6 pgs.

*Primary Examiner* — Paul T Chin
(74) *Attorney, Agent, or Firm* — Schmeiser Olsen & Watts LLP (57) ABSTRACT

A raising device realized to be connected to a tower segment of a wind turbine is provided. The raising device comprises a connection member to a raising machine and a plurality of holding members positioned at predefined distances from each other and orientated to be movable in radial locking directions which locking directions are such that the holding members when moved into a locking position at a predefined engagement position of the tower segment engage with a counter-shape of the tower segment, whereby the holding members are automatically tiltable and/or shiftable into the locking position by a movement mechanism. A method of equipping a tower segment of a wind turbine for transport by means of such raising device is also provided.

18 Claims, 8 Drawing Sheets

(51) Int. Cl.
    *B66C 1/62*     (2006.01)
    *E04H 12/34*     (2006.01)
    *F03D 1/00*     (2006.01)

(58) Field of Classification Search
    USPC ...... 294/67.3, 67.33, 67.31, 90, 91, 93, 104,
                    294/110.1, 110.2, 106, 115, 97
    See application file for complete search history.

(56) References Cited

U.S. PATENT DOCUMENTS

| | | | | |
|---|---|---|---|---|
| 2,327,005 | A * | 8/1943 | Babcock et al. | 294/106 |
| 2,370,482 | A * | 2/1945 | Weld | B66C 1/54 |
| | | | | 29/261 |
| 3,033,605 | A * | 5/1962 | Morrow, Jr. | B29D 30/0016 |
| | | | | 294/115 |
| 3,104,126 | A * | 9/1963 | Lovash | B21C 1/14 |
| | | | | 242/533.7 |
| 3,211,490 | A * | 10/1965 | Gardner et al. | 294/194 |
| 3,251,623 | A * | 5/1966 | Fredholm | B66C 1/54 |
| | | | | 294/93 |
| 3,264,027 | A * | 8/1966 | Luther | 294/16 |
| 3,330,591 | A * | 7/1967 | Pavelka | 294/90 |
| 3,935,954 | A * | 2/1976 | Woods | B60P 1/04 |
| | | | | 414/24.5 |
| 5,306,062 | A * | 4/1994 | Dodge | B66C 1/62 |
| | | | | 294/67.33 |
| 5,476,300 | A * | 12/1995 | Dodge | 294/81.21 |
| 6,042,165 | A * | 3/2000 | Thompson | B66C 1/62 |
| | | | | 294/67.1 |
| 6,371,543 | B1 * | 4/2002 | Fujikawa et al. | 294/82.13 |
| 6,840,730 | B2 * | 1/2005 | Noualy | A01D 87/127 |
| | | | | 414/24.5 |
| 7,237,815 | B2 * | 7/2007 | Ashby, Sr. | 294/110.1 |
| 8,764,082 | B2 * | 7/2014 | Krogh et al. | 294/67.33 |
| 8,764,083 | B2 * | 7/2014 | Belder | B66C 1/442 |
| | | | | 294/106 |
| 2001/0001525 | A1 * | 5/2001 | Shepard et al. | 294/81.61 |
| 2011/0318159 | A1 * | 12/2011 | Krogh | B66C 1/108 |
| | | | | 414/800 |
| 2013/0307282 | A1 * | 11/2013 | Belder et al. | 294/81.61 |
| 2015/0013242 | A1 * | 1/2015 | Andersen | F03D 80/00 |
| | | | | 52/123.1 |

FOREIGN PATENT DOCUMENTS

| | | |
|---|---|---|
| WO | WO 2012093940 A1 | 7/2012 |
| WO | WO2012101023 A2 | 8/2012 |

* cited by examiner

RAISING DEVICE CONFIGURED TO BE CONNECTED TO A TOWER SEGMENT

CROSS-REFERENCE TO RELATED APPLICATIONS

This application claims priority to EP Application No. 13176120.7, having a filing date of Jul. 11, 2013, the entire contents of which are hereby incorporated by reference.

FIELD OF TECHNOLOGY

The following relates to a raising device realized to be connected to a tower segment of a wind turbine. It also concerns a method of equipping a tower segment of a wind turbine for transport.

BACKGROUND

Wind turbines comprise a tower and a nacelle placed on top of that tower, whereby the nacelle is equipped with a rotor which rotates due to the impact of wind. In the nacelle, the rotational movement of the rotor is used to generate electric power.

Large wind turbine towers often comprise a number of tower segments, e.g. made of steel, which when assembled together form the complete wind turbine tower. The assembly of large wind turbine towers—in particular under offshore conditions, but also onshore—consumes a lot of time, effort, and financial resources. The standard state of the art is to assemble a wind turbine tower by attaching a number of brackets to an end flange of a tower segment and to connect a number of wires to these brackets. These wires are connected to a crane or to a similar raising machine and the tower segment is raised and transported to the site of assembly where it is connected either to a foundation of the wind turbine tower or to a lower tower segment to which the tower segment in question is then attached by e.g. bolting. After such assembly steps, the wires have to be disconnected from the tower segment, as well as the brackets, and the same procedure must be re-done for each tower segment until the complete wind turbine tower is established.

Such a procedure is very time-consuming and complicated in that it implies an attachment of both brackets and wires to the tower flange first and a detachment of both after the assembly process of each tower segment. In particular, it implies that staff has to manually attach the brackets and wires and later detach them again. This also constitutes a certain potential danger for staff, in particular in the upper operating heights of the wind turbine tower which can have up to 150 meters of height or even higher. The enormous need of installation time also means a large consumption of resources as for instance under offshore conditions, an installation vessel is necessary to carry the crane. The use of such vessel is very costly and thus any reduction of usage time of such vessel implies an enormous saving. Similar effects can be seen on onshore sites, with a lower, but still substantial cost factor. Furthermore, the forces and tensions inflicted on the tower flange during raising and transport is enormous: potentially (depending on wind conditions), at each bracket connection to the wires the full load of the complete tower section can occur so that the flanges must be designed very stable and large.

EP 2 402 278 B1 describes an arrangement for raising a tower segment of a wind turbine. It comprises a beam and a cross beam along both of which holding members are attached which holding members can engage with a flange of a tower segment when moved along the beam and cross-beam. The holding members are moved manually or by a motor into a desired operating position at which they can engage with a counter-shape of the tower segment.

SUMMARY

An aspect relates to providing an alternative raising device (and raising method), in particular an improved one in comparison with the above-mentioned state of the art. Such improvement is realized by providing a raising device, the use of which is less time-consuming than that of the state of the art.

According to embodiments of the invention, a raising device of the kind mentioned in the introductory paragraph comprises a connection member to a raising machine and a plurality of holding members positioned at predefined distances from each other and orientated to be movable in radial locking directions, which locking directions are such that the holding members when moved into a locking position at a predefined engagement position of the tower segment engage with a counter-shape of the tower segment, whereby the holding members are automatically tiltable and/or shiftable into the locking position by a movement mechanism.

In this context, it may be noted that the connection of the raising device to the tower segment is carried out at the top of such tower segment. Thus, if one considers the tower segment to be essentially tubular or cylindrical in shape, the top of such tower segment is that essentially round opening of the tower segment which is to face upwards when assembled in an upright position on the assembly site. This also implies that the tower segment can be raised by means of the raising device in such upright position, i.e. in the same orientation in which it is to be assembled eventually at the assembly site.

A connection member may for instance comprise a hook or an eye which can engage with a corresponding eye or hook from the raising machine. The raising machine may for instance be a crane with a wire to which the connection member can be connected.

It may further be noted that the expression "tower segment" refers both to a segment of a wind turbine tower which—together with other such segments—is part of the complete wind turbine tower but also may refer to a complete wind turbine tower. In fact, a complete tower can be raised in one piece (i.e. in an already assembled state in which segments of the tower have been connected to form the complete tower) in the context of embodiments of the invention. Firstly, embodiments of the raising device makes such raising possible because it can be built stable enough to carry the complete weight of such complete tower at one time. This would not be the case with the above-mentioned raising method with brackets and wires: several brackets would be necessary to achieve an overall enough stability of the connection of the tower segment to the raising device during transport. That also implies that several wires would be necessary and that each one of these wires would have to be made stable enough to carry the entire weight of the wind turbine tower due to movements of the tower in the wind. Thus, only the sufficiently stable device according to embodiments of the invention provides for a solution in which an entire wind turbine tower can be raised as one piece. In fact, even under conditions of transport of the wind turbine tower in one piece, with the raising device according to embodiments of the invention, it is possible to reduce the size and weight of the upper flanges if they are to be used as the counter-shape.

Secondly, such transport in one piece has the advantage that assembly times at the assembly site can be reduced to an absolute minimum. The entire wind turbine tower can already be transported to the assembly site in one piece and then simply be raised and transported from a means of transport such as a vessel to the assembly site where it is to be installed. Assembly time on that assembly site is thus dedicated wholly to the processes of raising, transport and installation of the wind turbine tower on a foundation.

Embodiments of the raising device comprise a plurality of holding members positioned at predefined distances from each other. These predefined distances and thus corresponding predefined positions of the holding members correspond with the position of the counter-shape of the tower segment to which the raising device is to be connected. That implies that, unlike in the state of the art mentioned above, the holding members are not positioned anywhere and can then be brought into a desired operating position manually or by means of a motor. Instead, the holding members are generally situated in that desired operating position and need not be moved there. In this context, an "operating position" means such position in which the holding member can be connected to (or disconnected from) the counter-shape of the tower segment by a pre-defined movement, namely a movement from an open position into a locking position and reverse. Thereby, the open position and the locking position of the holding member are also clearly defined and each holding member is mechanically limited in its movement so that it can only move between those two positions (i.e. between the open position and the locking position).

Corresponding to the open position and the locking position of each of the holding members is its locking direction and—reverse—its unlocking direction (i.e. the counter direction of the locking direction). Both the locking direction and unlocking direction are radial, i.e. along a straight line from the centre point of the (essentially tubular) tower segment to the shell of the tower segment in a section of the tower segment perpendicular to its longitudinal tubular extension. That means that the locking direction is either towards that centre point or away from it and that the unlocking direction is exactly opposite. For instance, the raising device may comprise three holding members aligned at equal distances along an outer or inner circumference of a tower segment to which they are to be connected. For that purpose each of the holding members can be connected at a predefined position to a holding beam at essentially one end of the holding beam whereas the other end of the holding beam is connected to the corresponding ends of the other holding beams. Therefrom results a kind of star-like structure of three holding beams.

Furthermore, the holding members are automatically tiltable and/or shiftable into their locking position by means of a movement mechanism. That implies that upon activating the movement mechanism the holding members are automatically tilted and/or shifted from the open position into the locking position or vice versa. Automatically tilting or shifting implies a purely mechanical movement rather than one induced by manual effort and/or motor power transmission and/or hydraulic/pneumatic power transmission. However, a support by a motor or a hydraulic system is principally feasible. The movement mechanism may connect the holding members to the connection member of the raising device so that a particular movement of the connection member automatically produces the tilting and/or shifting movement of the holding members unless such movement is intentionally blocked.

In the context of the embodiments of the invention, the term "holding member" refers to such a mechanical holding device that is movable in and/or against the locking direction. In addition, the raising device may also comprise other, non-movable members with a holding function and design which may for instance be used as a counterpart of a holding member. For instance, one such non-movable member may engage with the counter-shape of the tower segment at a first position, for instance by transferring the non-movable member below the counter-shape by means of form fit, i.e. by positioning the complete raising device with respect to the tower segment such that the non-movable member is engaged with the counter-shape. Then, in order to make sure that the raising device is stably connected to the tower segment, the holding members are moved into their locking positions at a second position (which functions as a counter position to the first position) so that the holding members in their locking positions together with the non-movable members provide a firm hold of the tower segment.

Embodiments of the invention also concern a tower segment of a wind turbine equipped with a raising device.

A method of the above-mentioned kind comprises the steps of connecting a raising device with a connection member to a raising machine to the tower segment, the raising device comprising the connection member and a plurality of holding members positioned at predefined distances from each other and orientated to be movable in radial locking directions, which locking directions are such that the holding members when moved into a locking position at a predefined engagement position of the tower segment engage with a counter-shape of the tower segment, whereby the holding members are automatically tiltable and/or shiftable into the locking position by a movement mechanism, and tilting and/or shifting the holding members into the locking position at the predefined engagement position of the tower segment engaging with the counter-shape.

Optionally, this method further comprises a raising step in which the raising device is raised by means of the raising machine. This step takes the equipment method further so that the method then constitutes a raising method or a method of transport rather than just a method of equipping the tower segment.

Particularly exemplary embodiments and features of the invention are revealed in the following description. Features of different claim categories may be combined as appropriate to give further embodiments not described herein.

At least one holding member, or each holding member, comprises a claw (which can also be considered to be a gripper). Such claw can engage with the counter-shape of the tower segment, for instance by going partially underneath and/or around the counter-shape. For instance, the counter-shape of the tower segment comprises an inner or outer connection flange to another tower segment and/or towards the nacelle parts of the wind turbine. A claw can thus be tilted or shifted underneath the connection flange and hold it with ease.

As stated above, embodiments of the raising device may comprise three holding members. However, it is principally possible that it only comprises two holding members. In exemplary embodiments, the number of holding members is an even number and that the holding members are arranged in pairs of corresponding holding members. In this context, at least two corresponding holding members are aligned along a straight line. This line is a radial line. In particular, these corresponding holding members can be realized/configured, positioned, and aligned such that their locking directions are counter directions. For instance, if the locking direction of a first holding member is towards the centre point of the tower section and the second, corresponding, holding member is positioned at the opposite side of the centre point of the tower section (with respect to the first holding member) and its locking direction is also towards the centre point of the tower section. Therefore, the second holding member's locking direction is the counter direction of the first holding member's locking direction. The tower segment is then held in between the two corresponding holding members, which exert a holding force towards the inner side of the tower segment. In contrast, both corresponding holding members can also be orientated in the opposite locking directions, i.e. facing away from the centre point of the tower segment, in which case they exert a holding force towards the outside of the tower segment. The first such described embodiment may be particularly useful if an outside flange is used as the counter-shape of the tower segment, whereas the second such described embodiment may be particularly useful if an inside flange is used as the counter-shape of the tower segment.

In an embodiment with two corresponding holding members, they may be connected to one common holding beam. The beam thus serves as a holding structure for the two corresponding holding members and constitutes the straight line along which the holding members are both aligned.

As for smaller and/or lighter tower segments, the use of two holding members can be sufficient, but three holding members already increase the stability of the connection between the tower section and the raising device considerably. In particularly exemplary embodiments, four holding members are used because this provides for a very high stability, whereas more than four holding members may not substantially add stability. In the context of four holding members, the use of corresponding (pairs of) holding members may be advantageous: The raising device according to embodiments of the invention comprise (at least) two pairs of corresponding holding members.

In this context, an exemplary embodiment of the raising device is characterized by a first pair of corresponding holding members being connected to a first common holding beam and a second pair of corresponding holding members being connected to a second common holding beam. This second holding beam is realized as a cross-beam of the first holding beam, whereby the cross-beam is orientated essentially perpendicularly to the first holding beam, which makes the construction of the raising device particularly stable. This further makes possible that the raising device can be positioned such that the point where the first holding beam and the second holding beam are interconnected can essentially be positioned at the above-mentioned centre point of the tower section and that from this centre point the holding members can be arranged essentially equidistantly along the (inner or outer) circumference of the tower section.

This embodiment can be further enhanced by interconnecting the first holding beam and the second holding beam by a number of diagonal connections such as interconnecting beams, ropes or the like. Such diagonal (inter)connections can further stabilize the raising device so that it can carry even larger loads without the risk/danger of getting twisted or worn.

It is possible to only temporarily position the holding members at their predefined positions, i.e. at their predefined distances from each other. That means that the predefined distance can be varied depending on the kind (and width, i.e. in the case of a round tower segment its diameter and radius) of the tower segment to be raised. The holding members can be fixedly installed, i.e. permanently fixed at the predefined distance. This is in particular so if complete towers are to be raised as one by the raising device because then the same width of the tower (segment) always applies for wind turbines of the same make of wind turbine: such tower may always carry a nacelle of a particular size, which depends on the nominal power output of the wind turbine. That width currently varies between about 3000 mm and 4500 mm. More specifically, currently a 3.6 MW wind turbine of the applicant has a width of 3128 mm and a 6 MW wind turbine a width of 4145 mm. A change of position of the holding members may not be necessary in case one decides to always raise towers of the same make of wind turbines so that instead a more stable, namely fixed, position of the holding members is possible.

In this context, it may be noted that also the orientation of the holding members, i.e. their designated locking direction could be changed (for instance to be able to engage both with inner and outer flanges of tower segments), but again, in particular in the above-mentioned context of complete towers to be raised, the holding members are fixed also with respect to their orientation.

According to an exemplary embodiment, the holding members are mechanically interconnected via the movement mechanism with the connection member via a number of hinges such that upon pulling the connection member upwards, the holding members automatically tilt and/or shift into the locking position unless blocked. This means that there is a mechanical tilting connection between the connection member and the holding members: Once the raising device has been brought into a particular position—designated for initiating the engagement of the holding members with their counter-shape(s)—the raising device only has to be pulled upwards via the connection member and automatically the holding members get into their locking positions. This highly automatized mechanism provides for a safe and very easy locking procedure which thus saves time, effort and expenditure.

As stated above, it may be advantageous if the holding members are realized, i.e. sized, mechanically designed and located, to engage with an upper (inner and/or outer) flange of the tower segment along its (inner and/or outer) circumference. This upper flange thus comprises the counter-shape for the holding members. Such flanges have proven to be stable enough to withstand all raising forces, which means they can clearly carry the complete weight even of a complete tower. Such also applies for towers of today's sizes and weights, e.g. for 90 meter high steel towers weighing about 300 tons.

For safety reasons, embodiments of the raising device may further comprise a blocking mechanism realized/configured to block a movement of the holding members into and/or out of the locking position. That means that once the blocking mechanism is activated, the holding members will essentially remain in their open or locked position. If the holding members are thus in their locking position they cannot be unlocked until the blocking mechanism is deactivated. This prevents the raising device from sudden failure of the locking function of the holding members, for instance due to weather conditions or other negative impacts on the tower segment in a raised position. Thus, the blocking mechanism is a means of how to effectively prevent the tower segment from uncontrolledly falling down while being raised by means of the raising device.

In particular, such blocking mechanism can comprise a pin which engages with a recess of a movable element of the raising device (i.e. in particular of the movement mechanism) which movable element is connected to at least one of, or all of the holding members in order to block a movement of that/the holding member(s). The pin can easily be inserted manually into the recess once the holding member(s) has/ have reached a desired position. The same way, the pin can be extracted from the recess once a different position (and thus a change of position) of the holding member(s) is desired.

Embodiments of the invention can further be enhanced by the raising device also comprising a cover realized to cover an open part of the tower segment, i.e. an upper opening of the tower segment facing upwards when the tower segment is positioned in the designated position of assembly in which a nacelle can be placed on the top of the tower. Such cover can serve to shield the inside of the tower segment from influences from above, in particular rain or snow. The cover can be loosely connected to the raising device, for instance when the cover is installed on the tower segment. In such case, the cover can be installed on the tower segment first and then the raising device can be connected to both the tower segment and the cover. Alternatively, the cover and the raising device can be assembled (i.e. interconnected) and then connected to the tower segment together.

In this context, the cover may comprise at least one opening realized as a service opening for staff and/or as a through-hole for at least one of the holding members. A service opening, for instance a hatch which can be closed by a cover when no staff wants to pass can permit staff from the inner side of the tower segment to the outside on top of the tower segment (or reverse), for instance in order to permit assembly work in these locations. A through-hole is sized such that it permits the passage of the corresponding holding member. It may be sized and realized such that it is essentially in contact with the holding member (or a connection of the holding member to other parts of the raising device) so that essentially no rain or snow can pass through the through-hole. I may also be sized slightly larger to permit easier passage of the holding member (or a connection of the holding member to other parts of the raising device).

BRIEF DESCRIPTION

Some of the embodiments will be described in detail, with reference to the following figures, wherein like designations denote like members, wherein.

DETAILED DESCRIPTION

Figure 1:
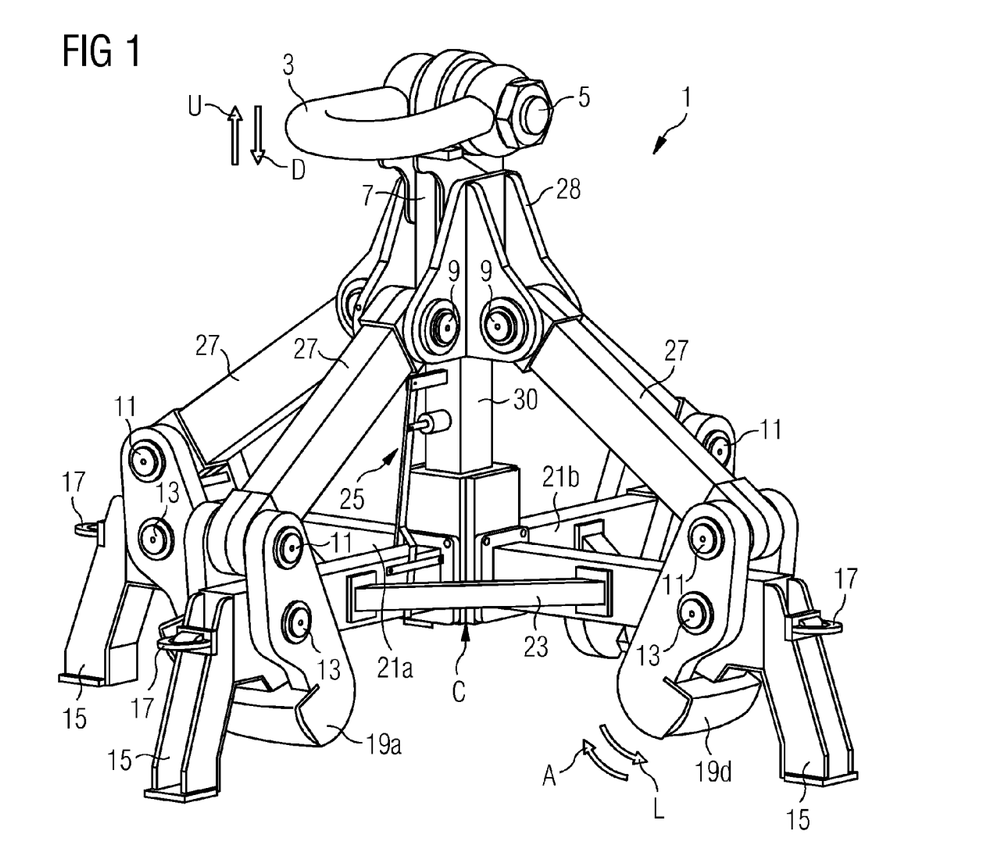
FIG. 1 shows a perspective view of an embodiment of a raising device.

FIG. 1 shows a raising device 1 for raising a tower section (not shown) of a wind turbine. The raising device 1 comprises a connection member 3 realized as an eye which is attached via a first hinge 5 to four connection shapes 28. The connection shapes 28 can each be hingedly attached via a second hinge 9 a connection beam 27. The connection beams 27 are thus connected essentially at their first end via the second hinges 9 to the connection shapes 28 and at their second ends to third hinges 11 to holding members 19a, 19b, 19c, 19d (the two latter being obscured in the figure due to the perspective view) that can be realized as claws. The holding members 19a, 19b, 19c, 19d are realized as two pairs of corresponding holding members 19a, 19b, 19c, 19d, namely a first pair of corresponding holding members 19c, 19d is aligned along a first holding beam 21a and a second pair of corresponding holding members 19a, 19b is aligned along a second holding beam 21b.

The raising device 1 thus further comprises a first holding beam 21a and a second holding beam 21b which is a perpendicularly positioned cross-beam to the first holding beam 21a. These two holding beams 21a, 21b are directly interconnected at the centre C of the raising device 1 and indirectly by diagonal connections 23 at about the middle of the distance of each holding beam 21a, 21b from the centre C of the raising device 1 to the end of the respective holding beam 21a, 21b. At these ends of the holding beams 21a, 21b fourth hinges 13 are positioned which connect each of the holding beams with one of the holding members 19a, 19b, 19c, 19d.

From the centre C of the raising device 1 at which the two holding beams 21a, 21b are interconnected directly, an upward-facing beam 30 is also connected to the two holding beams 21a, 21b (directly or indirectly). That beam 30 is hollow and essentially extends up to the connection shapes 28, but is not directly connected to these. Inside the hollow beam 30 there is positioned another guiding beam 7 which is connected to the connection shapes 28 and thus indirectly to the connection member 3.

At either end of each of the holding beams 21a, 21b there are positioned legs 15 extending downwards (i.e. away from the connection member 3) on which the raising device 1 can rest stably if stored on ground. In addition, at all of these mentioned ends of the holding beams 21a, 21b there is also an eye 17. The eyes 17 can be used to move and steer the raising device (and a tower segment connected to it) in a circle, i.e. to orientate the tower segment during a raising and transport processes and in particular during assembly of the tower segment at a designated operating site. Further, the raising device 1 comprises a blocking mechanism 25, the function and details of which will be explained with reference to FIGS. 4 and 5.

When the raising device 1 is raised by a raising machine such as a crane, it is connected to that raising machine via the connection member 3 which is thus raised in an upward direction U. Reversely, when the raising device 1 is lowered to the ground, it is lowered in a downward direction D until the connection member 3 goes downwards into the position shown in FIG. 1. At the same time, due to the movement mechanism of the raising device 1, the raising force while raising the raising device 1 in the upward direction is transferred via the four hinges 5, 9, 11, 13 into a moving force which tilts each of the holding members 19a, 19b, 19c, 19d in a locking direction L, i.e. out of the open position depicted in FIG. 1 into a locking position. Reversely, when no raising force is applied to the raising device 1, i.e. when the connection to the raising machine via the connection member 3 is released or loose, the weight of the upper parts of the raising device 1 is enough to move the holding members 19a, 19b, 19c, 19d from the locking position in an counter direction A to the locking direction L into the open position again. Additionally, this movement in the counter direction A may be supported by actors such as springs (not shown).

In essence, this construction permits an automatic tilting movement of the holding members 19a, 19b, 19c, 19d in both the locking direction L and the counter direction A based on the force exerted on the connection member 3. No manual or motor support of that movement is necessary.

In this context, it can be stated that the term "movement mechanism" refers to all those movable parts of the raising device 1 which interconnect the connection member 3 with the holding members 19a, 19b, 19c, 19d serving to transfer the raising (and lowering) forces inflicted on the connection member 3 into forces for moving the holding members 19a, 19b, 19c, 19d into or out of the locking position, i.e. in the locking direction L or the counter direction A.

Figure 2:
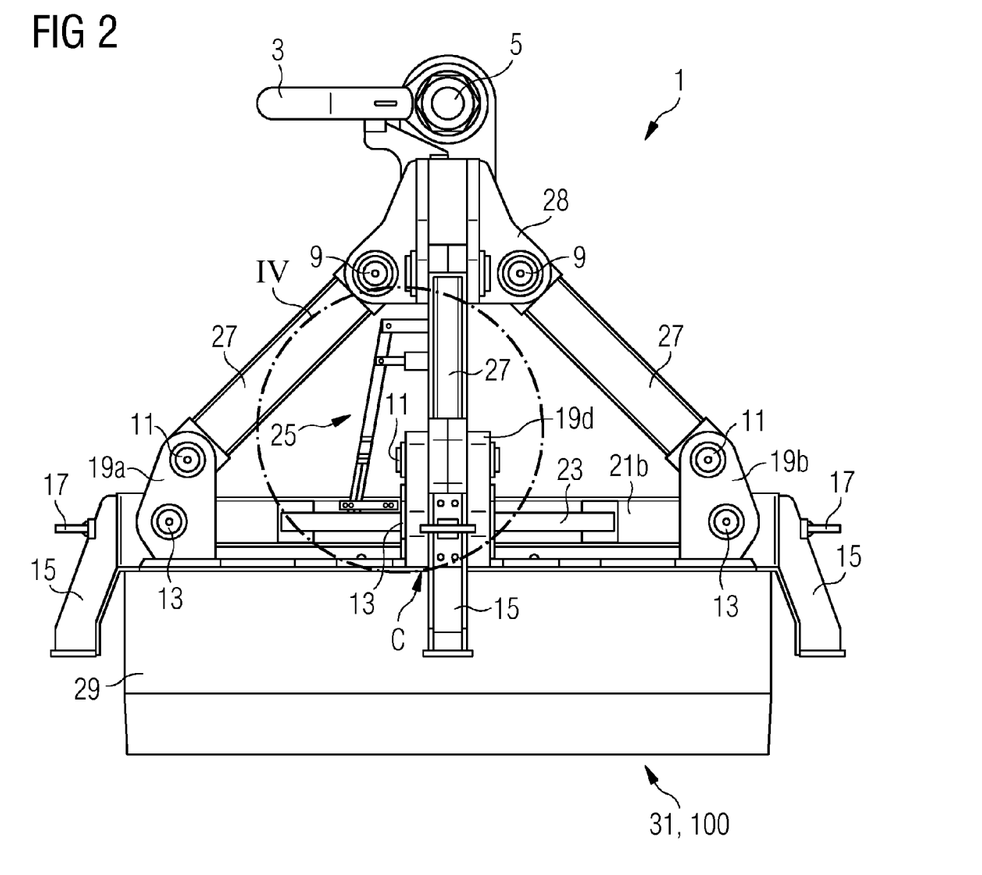
FIG. 2 shows a first side view of an embodiment of the raising device placed on top of a tower segment in a locked position.

Referring now to FIG. 2, which is a first side view of the same raising device 1 installed on top of a tower segment 31 of a wind turbine 100. The raising device 1 is thereby in a locked position, i.e. the holding members 19a, 19b, 19c, 19d have been moved completely in the locking direction L. Therefore, they engage with an inwards protruding part (not shown) of an inner flange 29 of the tower segment 31 which inner flange 29 is comprised of the top element of the tower segment 31 which can be seen in FIG. 2 and of the inwards protruding part which cannot be seen. As the holding members 19a, 19b, 19c, 19d are all orientated with their locking directions towards the inner surface of the tower segment 31, their lower part has been tilted below the inner flange 29 so that the holding members 19a, 19b, 19c, 19d facing into four directions and all orientated in a 90° angle to the next holding member hold the inwards protruding part of the inner flange 29 firmly from underneath. In this arrangement, the feet 15 are positioned outside of the tower segment 31.

Figure 3:
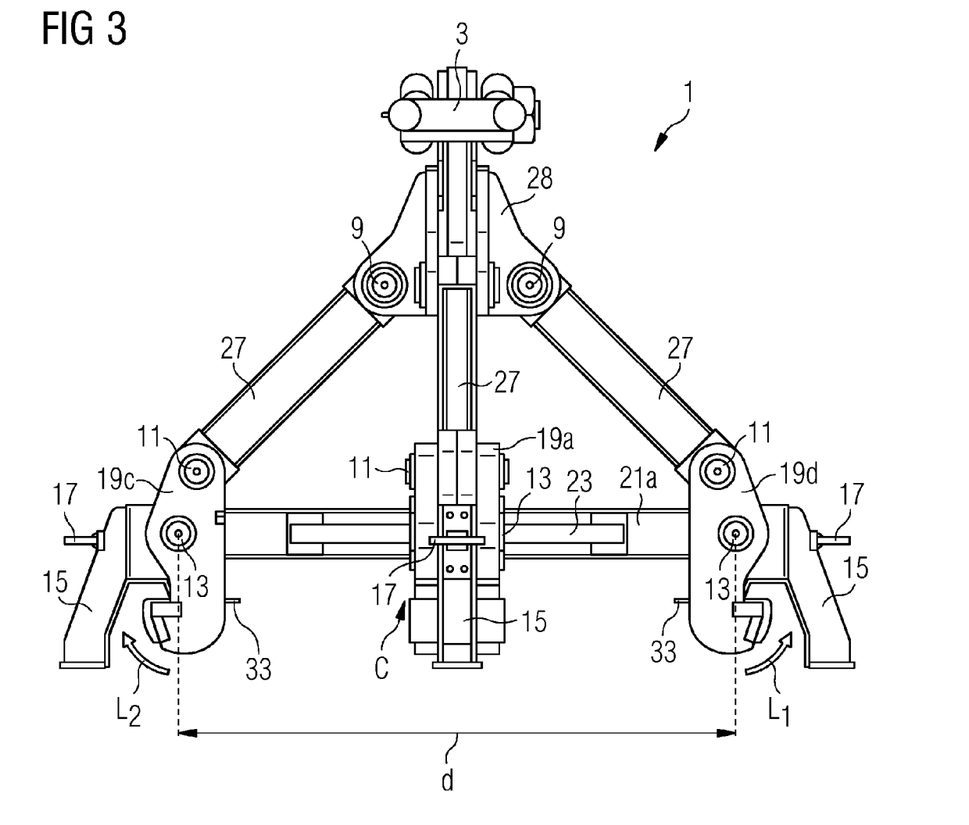
FIG. 3 shows a second side view of an embodiment of the raising device without the tower segment.

FIG. 3 shows the same raising device 1 in a second side view which is perpendicular to the side view of FIG. 2. It can be seen here that along the first holding beam 21a (and the same applies with respect to the second holding beam 21b and all the elements connected with it) the holding members 19a, 19b, 19c, 19d are positioned fixedly via their fourth hinges 13 to the first holding beam 21a along a predefined distance d. The locking direction $L_1$ of the holding member 19d at the right hand side is orientated away from the centre C of the raising device 1 further to the right whereas the locking direction $L_2$ of the holding member 19c at the left hand side faces exactly in the opposite direction.

Further, it can be seen in FIG. 3 that to each of the holding members 19a, 19b, 19c, 19d there is connected a connection eye 33 projecting towards the centre C of the raising device 1. These connection eyes 33 can be used to connect to a cover which will be explained with reference to FIGS. 6 and 7.

Figure 4:
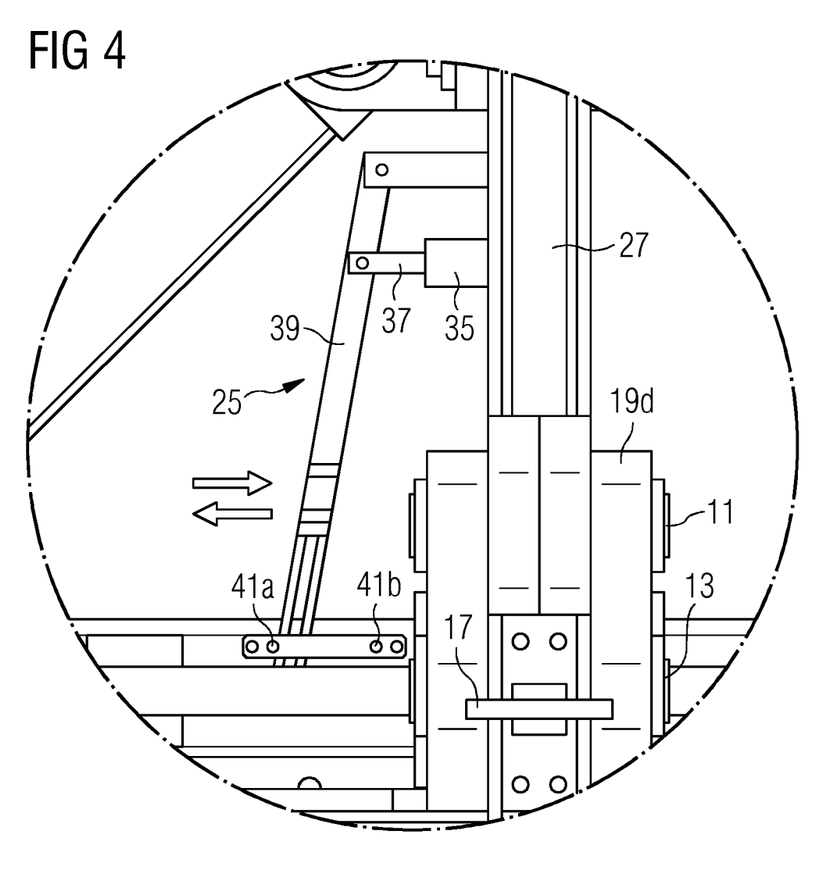
FIG. 4 shows a detailed view of an embodiment of a detail from FIG. 2.
Figure 5:
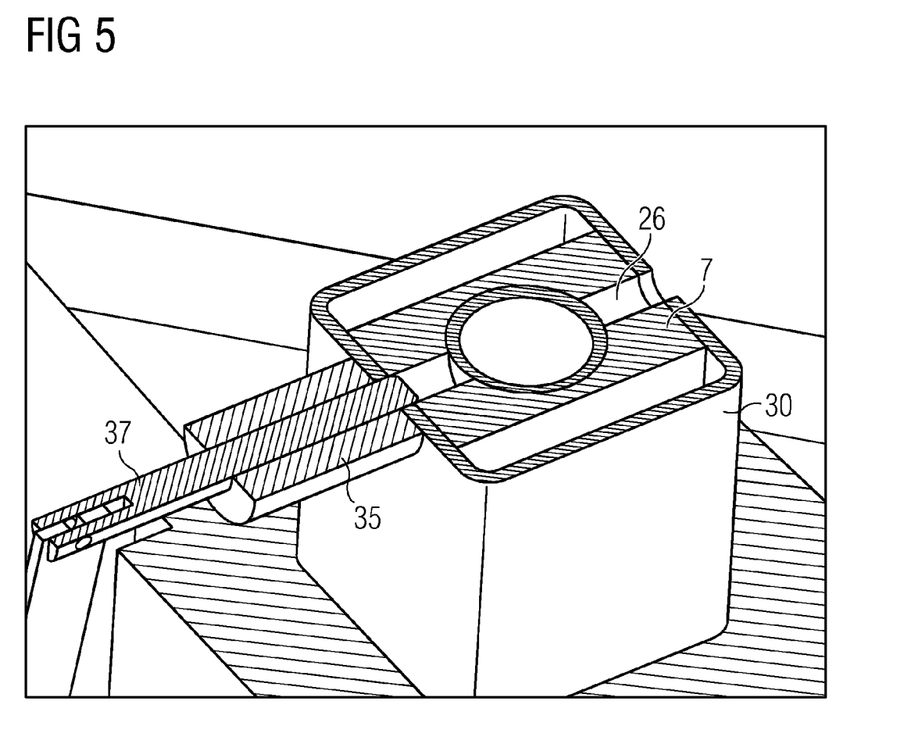
FIG. 5 shows a perspective sectional view of an embodiment of a further detail of the raising device.

FIGS. 4 and 5 serve to explain the blocking mechanism 25 in more detail. The blocking mechanism 25 comprises an inlet shell 35 for a pin 37 through which the pin 37 can be led inside the beam 30 (obscured in this figure due to the perspective). A handle 39 is connected to the pin 37 in order to facilitate manual (or motor-driven) movement of the pin 37 into the beam 30 and out again. At the lower end of the handle 39 two catch bolts 41a, 41b are positioned which are realized to firmly hold the handle 39 in a desired first, open, position (corresponding to the left catch bolt 41a) and in a desired second, blocked, position (corresponding to the right catch bolt 41b). Thus, the catch bolts 41a, 41b serve to fix the handle 39 in one of these two positions to prevent it from moving undesirably.

FIG. 5 shows a section view of the beam 30 with its inner guiding beam 7. In order for the pin 37 to block the movement of the movement mechanism, the guiding beam 7 comprises two recesses 26 along its longitudinal extension (i.e. the upward direction U and the downward direction D) one of which is depicted in FIG. 5. At two given predefined positions of the guiding beam 7 corresponding with the locking position and the open position of the holding members 19a, 19b, 19c, 19d, the pin 37 can thus be inserted into the recesses 26 of the guiding beam 7 thus blocking the guiding beam 7 in its position and further blocking any movement of the movement mechanism.

Figure 6:
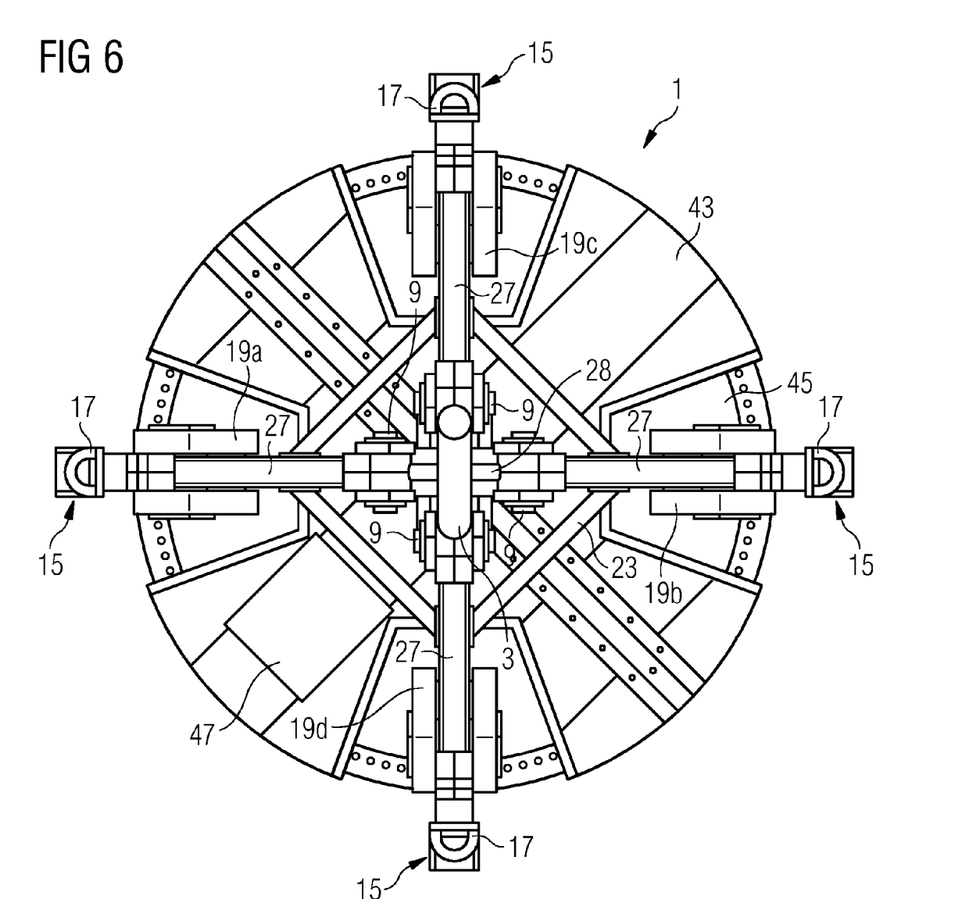
FIG. 6 shows a top view of an embodiment of the raising device equipped with a cover.
Figure 7:
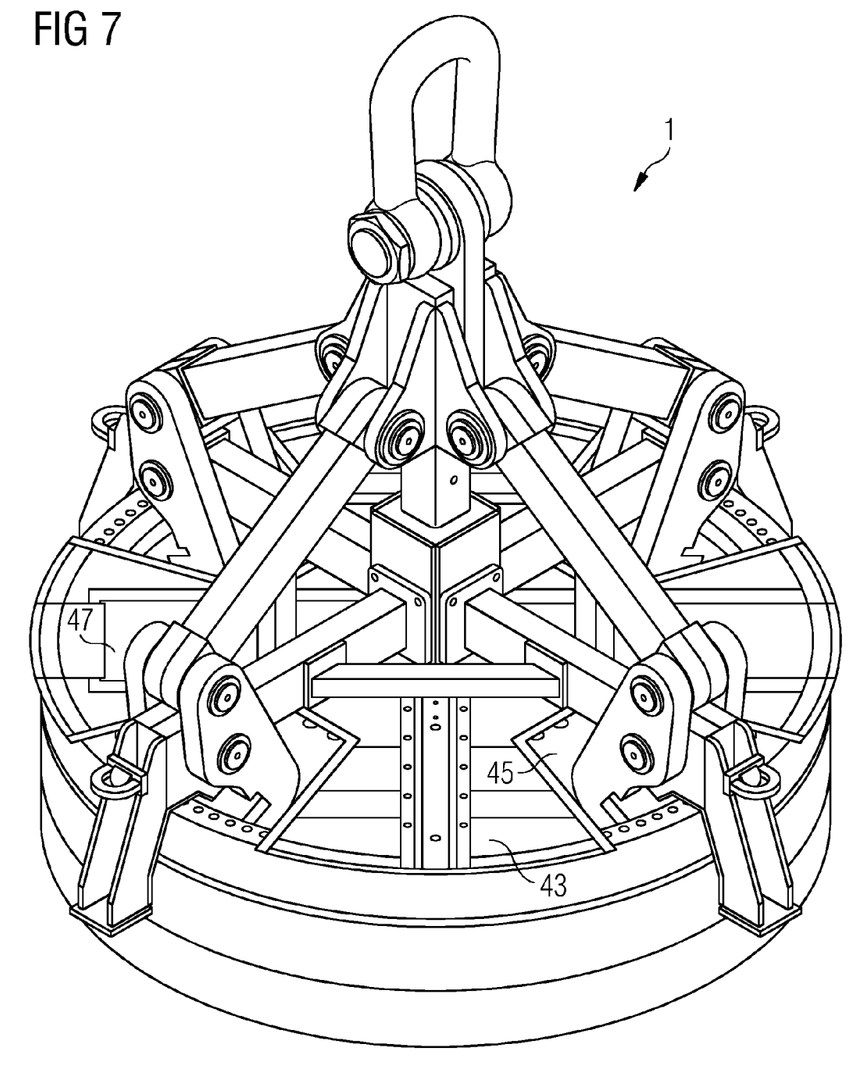
FIG. 7 shows a perspective view of an embodiment of the raising device with the cover placed on top of a tower section.

Turning to FIGS. 6 and 7, this shows embodiments of the raising device 1 further equipped with a cover 43. The cover 43 is connected to the raising device via 1 the connection eyes 33 (cf. FIG. 3) and serves to shield the inner side of the tower segment 31 from the ambient environment, in particular from rain or snow. The cover 43 comprises a first opening 47 realized as a service hatch 47 through which staff can climb in order to get from the inside of the tower segment 31 to the upper side of the cover 43 or reverse. Moreover, the cover 43 comprises four through-openings 45 through which the holding members 19a, 19b, 19c, 19d are inserted.

Figure 8:
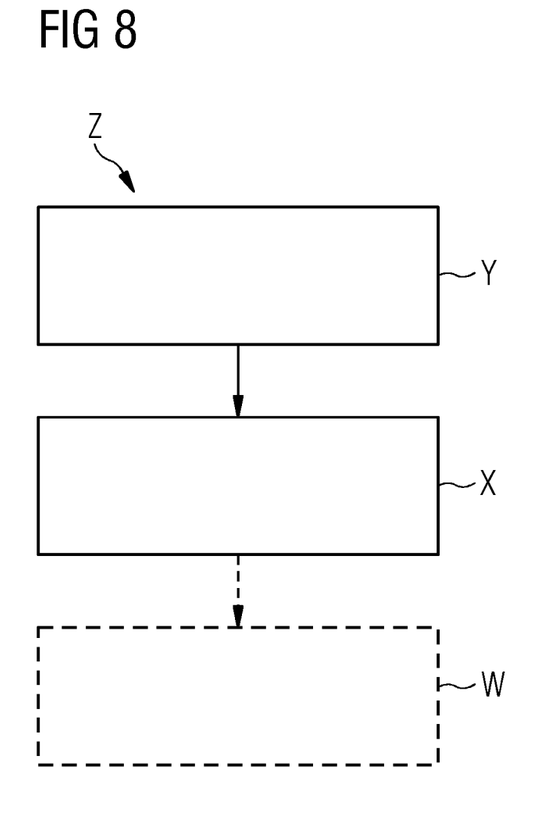
FIG. 8 shows a block diagram depicting principal steps of an embodiment of a method.

FIG. 8 shows a schematic block diagram of an embodiment of an equipment method Z. Thereby, reference is made to the embodiment of the raising device explained in the previous figures. The method comprises the following steps in the given sequence of actions:

In a first step Y, the raising device 1 connected with its connection member 3 to a raising machine is connected to the tower segment 31. Alternatively, the raising device 1 may first be connected to the tower segment 31 and then via the connection member 3 to a raising machine. In a second step X, the holding members 19a, 19b, 19c, 19d are tilted into the locking position at the predefined engagement position of the tower segment 31 engaging with the counter-shape, i.e. the inner flange of the tower segment 31. In an optional step W, the raising device 1 is raised by means of the raising machine by which action the tower segment 31 is automatically raised together with the raising device 1 and can thus be transported, for instance to an assembly site of the wind turbine.

Although embodiments of the invention have been disclosed in the form of exemplary embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. A raising device configured to be connected to a tower segment of a wind turbine, the raising device comprising:
   a connection member, the connection member configured to be engaged by a raising machine for raising the raising device; and
   a plurality of holding members positioned at predefined distances from each other and orientated to be movable in radial locking directions, the radial locking directions are such that the plurality of holding members, when moved into a locking position at a predefined engagement position of the tower segment, engage with a counter-shape of the tower segment, whereby the plurality of holding members are automatically moveable into the locking position by a movement mechanism;
wherein the plurality of holding members are mechanically interconnected via the movement mechanism with the connection member via a number of hinges such that upon pulling the connection member upwards, the plurality of holding members automatically move into the locking position unless blocked.

2. The raising device according to claim 1, wherein each of the plurality of holding members comprise a claw.

3. The raising device according to claim 1, wherein at least two corresponding holding members of the plurality of holding members are aligned along a straight line.

4. The raising device according to claim 3, wherein the at least two corresponding holding members are connected to a single common holding beam.

5. The raising device according to claim 1, wherein the first common holding beam and the second common holding beam are interconnected by a number of diagonal connections.

6. The raising device according to claim 1, wherein the plurality of holding members are fixedly installed at the predefined distances.

7. The raising device according to claim 1, wherein the plurality of holding members are configured to engage with an upper flange of the tower segment along its circumference which the upper flange comprises the counter-shape.

8. The raising device according to claim 1, comprising a blocking mechanism configured to block a movement of the plurality of holding members into or out of the locking position.

9. The raising device according to claim 8, wherein the blocking mechanism comprises a pin which engages with a recess of a movable element of the raising device, further wherein the movable element is connected to at least one of the plurality of holding members in order to block a movement of that holding member.

10. The raising device according to claim 1, further comprising a cover configured to cover an open part of the tower segment.

11. The raising device according to claim 10, wherein the cover comprises at least one opening that is a service opening for staff or as a through-hole for at least one of the plurality of holding members.

12. A tower segment of a wind turbine, the tower segment being raised by a raising device according to claim 1.

13. A method of equipping a tower segment of a wind turbine for transport comprising the steps of:
connecting a raising device to the tower segment, the raising device having a connection member to a raising machine, wherein the raising device comprises:
the connection member, and
a plurality of holding members positioned at predefined distances from each other and orientated to be movable in radial locking directions, the radial locking directions are such that the plurality of holding members, when moved into a locking position at a predefined engagement position of the tower segment, engage with a counter-shape of the tower segment, wherein the plurality of holding members are mechanically interconnected via the movement mechanism with the connection member via a number of hinges such that upon pulling the connection member upwards, the plurality of holding members automatically move into the locking position unless blocked; and
automatically moving, by a movement mechanism, the plurality of holding members into the locking position at the predefined engagement position of the tower segment engaging with the counter-shape.

14. The method according to claim 13, further comprising the step of: raising the raising device by means of the raising machine.

15. The method according to claim 13, wherein the raising device further includes a first pair of corresponding holding members connected to a first common holding beam and a second pair of corresponding holding members connected to a second common holding beam that is separate from the first common holding beam, and which is a cross-beam of the first common holding beam.

16. The raising device according to claim 1, wherein the connection member is a single eye.

17. The method according to claim 13, wherein the connection member is a single eye.

18. The raising device according to claim 1, wherein a first pair of corresponding holding members is connected to a first common holding beam and a second pair of corresponding holding members is connected to a second common holding beam that is separate from the fist common holding beam, and which is a cross-beam of the first common holding beam.

* * * * *